(12) United States Patent
Hiroshima et al.

(10) Patent No.: US 6,705,584 B2
(45) Date of Patent: Mar. 16, 2004

(54) LIQUID CRYSTAL DISPLAY DEVICE

(75) Inventors: Minoru Hiroshima, Chosei (JP);
Tatsuo Hamamoto, Mobara (JP);
Hironobu Yamada, Mobara (JP)

(73) Assignee: Hitachi, Ltd., Tokyo (JP)

( * ) Notice: Subject to any disclaimer, the term of this patent is extended or adjusted under 35 U.S.C. 154(b) by 52 days.

(21) Appl. No.: 10/177,105

(22) Filed: Jun. 24, 2002

(65) Prior Publication Data
US 2003/0025868 A1 Feb. 6, 2003

(30) Foreign Application Priority Data
Aug. 1, 2001 (JP) .................................. 2001-233385

(51) Int. Cl.[7] ...................... G02F 1/1339; G02F 1/1335
(52) U.S. Cl. ........................ 249/155; 349/153; 349/156; 349/190; 349/106
(58) Field of Search ......................... 349/155, 156, 349/153, 190, 106, 123, 125

(56) References Cited

U.S. PATENT DOCUMENTS

| | | | |
|---|---|---|---|
| 6,151,092 A | * | 11/2000 | Fujimura et al. .......... 349/156 |
| 6,384,882 B1 | * | 5/2002 | Nagayama et al. ......... 349/110 |
| 6,570,639 B1 | * | 5/2003 | Manabe et al. ............. 349/190 |
| 2001/0007733 A1 | * | 7/2001 | Matsuyama et al. ........... 430/7 |
| 2001/0052960 A1 | * | 12/2001 | Saito et al. ................ 349/155 |
| 2002/0093617 A1 | * | 7/2002 | Matsuyama et al. ........ 349/156 |

* cited by examiner

Primary Examiner—Toan Ton
Assistant Examiner—Mike Qi
(74) Attorney, Agent, or Firm—Reed Smith LLP; Stanley P. Fisher, Esq.; Juan Carlos A. Marquez, Esq.

(57) ABSTRACT

In a liquid crystal display device comprising a first substrate having switching elements formed for respective pixel electrodes thereon and a second substrate having color filters and a common electrode formed on a main surface thereof, the present invention provides a plurality of columnar spacers formed on both areas of the second substrate inside and outside the common electrode, covers a group of the columnar spacers formed on the common electrode with an alignment film, and arranges another group of the columnar spacers formed around the common electrode at both sides of a sealing material sticking the first substrate and the second substrate to one another. According to the present invention, the group of the columnar spacers fixed to the second substrate with the alignment film firmly secures a gap between the first and second substrates in cooperation with the another group of the columnar spacers arranged so as to compensate for deformation of the sealing material.

4 Claims, 7 Drawing Sheets

LIQUID CRYSTAL DISPLAY DEVICE

BACKGROUND OF THE INVENTION

1. Field of the Invention

The present invention relates to a liquid crystal display device, and more particularly to a liquid crystal display device which is provided with spacers having novel constitution for securing a fixed distance or gap between a pair of substrates which seals liquid crystal therebetween.

2. Description of the Related Art

A liquid crystal display device has been popularly used as a display device for a notebook type computer or a computer monitor which is capable of providing a high-definition color display. This type of liquid crystal display device is substantially configured such that liquid crystal is filled in a gap formed between a pair of substrates which are opposite to one another, wherein at least one of the substrates is made of transparent glass or the like.

A liquid crystal display device is roughly classified into a type which performs lighting and extinguishing of light of given pixels by selectively applying a voltage to respective electrodes for forming pixels formed on a pair of substrates (simple-matrix type liquid crystal display device) and a type which performs lighting and extinguishing of light of given pixels by controlling several types of electrodes and switching elements for selecting pixels formed on either one or both of the above-mentioned substrates (active-matrix type liquid crystal display device).

Typically, the active-matrix type liquid crystal display device employs thin film diodes (TFDs) or thin film transistors (TFTs) as the switching elements formed on one substrate. Particularly, because of its characteristics of being thin and light-weighted and capable of exhibiting high image quality comparable to image quality of a cathode ray tube, the liquid crystal display device using the thin film transistors has been popularly used as a display terminal monitor or the like of various types of OA equipments.

A display method of this active-matrix type liquid crystal display device is roughly classified into following two methods. One display method is a method in which a liquid crystal composition is sandwiched between two sheets of substrates on which transparent electrodes are respectively formed, the liquid crystal composition is operated by voltages applied to the transparent electrodes, and display is performed by modulating light incident on the liquid crystal layer after passing through the transparent electrodes (so-called vertical electric field method or TN method). Products which have been popularly commercialized adopt this method.

Further, another method is a method in which liquid crystal composition is operated due to an electric field formed substantially parallel to a substrate surface between two electrodes constituted on the same substrate, and display is performed by modulating light incident on the liquid crystal composition layer through a gap formed between these two electrodes (IPS or lateral electric field method).

In the liquid crystal display device, it is necessary to maintain a gap formed between a pair of substrates which sandwich liquid crystal therebetween, that is, to maintain a cell gap to a given value. As means for maintaining such a gap, fine beads (bead spacers) made of glass or resin have been popularly used in the past. Since these bead spacers are scattered on a surface of one substrate using spray means or the like before laminating respective substrates, these bead spacers are distributed also in pixel regions. Accordingly, there has been a problem that a transmitting light or a reflecting light passes through bead spacers and generates a so-called leaking of light thus degrading contrast.

To overcome such a problem derived from the bead spacers, there has been proposed a method in which spacers are provided by fixedly forming columnar members at portions avoiding pixel regions with respect to the above-mentioned lateral electric field method (for example, Japanese Laid-open Patent Publication 48636/1998). These spacers are referred to as columnar spacers, wherein the spacers are formed in a columnar shape by laminating color filters of a plural colors and a light shielding layer, or the spacers are formed in a columnar shape by laminating end portions of color filters, or the spacers are formed on a color filter substrate side where wiring and electrodes are not present using a photolithography technique which forms the spacers by exposure/etching using a photosensitive resist.

SUMMARY OF THE INVENTION

However, since the TN (Twisted Nematic) type liquid crystal display device is provided with a common electrode at a color filter substrate side, the order of forming the common electrodes and the columnar spacers is limited. Over the color filters of the color filter substrate, a transparent protective film (overcoat) may also be formed to level the unevenness. In the conventional color filter substrate having such a constitution, the columnar spacers are formed on the transparent protective film using a photosensitive resist and, thereafter, the columnar spacers and the transparent protective film are covered with the common electrode, and an orientation film is further formed on the common electrode. Such a color filter substrate is disclosed in Japanese Laid-open Patent Publication 84394/1999, for example. On the other hand, with respect to the color filter substrate which forms the columnar spacers by laminating color layers (color filter layers), the common electrode is formed such that the common electrode covers the columnar spacers after the columnar spacers are formed.

However, with respect to the TN type liquid crystal display device, as mentioned above, when the color filter substrate which covers the columnar spacers with the common electrode after the columnar spacers are formed and a so-called thin film transistor substrate on which thin film transistors and pixel electrodes which are connected to the thin film transistors are formed for respective pixels are laminated to each other, the common electrode which is formed on upper portions of columnar spacers are projected toward a main surface of the thin film transistor substrate from a main surface of the color filter substrate. Accordingly, a conductive film which constitutes the common electrode above the main surface of the color filter substrate and electrode layers such as wiring layers or the above-mentioned pixel electrodes which are formed above the main surface of the thin film transistor substrate are brought into contact with each other thus generating short-circuit whereby the product failure such as defective pixels or the like are brought about. In the above-mentioned Japanese Laid-open Patent Publication 84394/1999, although an insulation film is provided to prevent the short-circuit, steps for forming the insulation layer become necessary.

Usually, it is considered that the adhesiveness between the common electrode formed of ITO (Indium Tin Oxide) and the columnar spacers formed of resin material is not favorable. Accordingly, the columnar spacers are moved or turned down in a cell gap adjustment step so that a given cell gap can not be secured or the columnar spacers are projected into the pixel regions thus generating leaking of light. Further, since the common electrode is selectively formed on a display area of the color filter substrate, it is difficult to maintain the gap between two substrates to a fixed value in the display area, in a periphery thereof and in a sealing region. Further, with only the provision of the columnar spacers formed in the display area, in laminating two substrates, when only a sealing material is applied to a sealing portion, that is, peripheral portions of two substrates, since a pressing force is not uniformly applied to the display area and the peripheral portion at the time of adjusting the cell gap, it is difficult to perform the uniform gap adjustment with respect to the gap between the two substrates. These constitute conventional problems to be solved.

On the other hand, Japanese Laid-open Patent Publication 21902/2001 discloses a technique in which columnar spacers are formed not only a display area (a region for sealing a liquid crystal layer therein which is substantially surrounded by a sealing member for laminating the above-mentioned color filter substrate and the thin film transistor substrate) but also a so-called peripheral region which is disposed around the display area (outside the sealing member) and a cell gap, that is, a gap defined between main surfaces of both substrates is made uniform. The spacers disclosed in this publication are formed on upper portions of color filter layers as single resin layers and are formed on an upper surface of a counter electrode (an oxide film having conductive property) formed above the color filters in the display area.

Accordingly, the height of these spacers can be adjusted by changing the thickness of the single layer made of resin between the display area and the peripheral region. When the spacers are formed by laminating color filter layers respectively having three primary colors (here, these layers being defined as layers made of resin, for example, constituting color filters, hereinafter also referred to as color layers), for example, by laminating in the order of a red color layer, green color layer and a blue color layer from a main surface of a color filter substrate and hence, the adjustment of height of spacers is limited due to the thickness of respective color layers.

Further, in the TFT type liquid crystal display device adopting a TN method, so long as color layers respectively having three primary colors are formed in a given shape over the main surface of the color filter substrate, and so-called color filters (color filters in a narrow definition in which the above-mentioned color layers of three primary colors are arranged two-dimensionally) are formed, and thereafter, common electrode (also referred to as reference electrode or counter electrode) is formed over the color filters, there is no other way but to form the common electrode on upper surfaces of the spacers on which color layers of different colors are laminated and hence, the common electrode may be short-circuited with pixel electrodes or video signal lines which are formed on the thin film transistor substrate. The spacers described in this publication also have an advantageous effect that the spacers prevent such short-circuit.

However, even when the invention described in Japanese Laid-open Patent Publication 21902/2001 which changes the thickness of the single resin layers which constitute the spacers in response to regions where the spacers are formed is adopted, it is difficult to secure the uniform cell gap in a satisfying manner. That is, in an actual manufacturing of the liquid crystal display device, there arises a problem that the color layers which substantially constitute layers which generate contaminants in the substrate manufacturing step are formed in the peripheral region of the color filter substrate. That is, as this publication teaches, among thin films which are formed on the main surface of the color filter substrates, the color layers are formed with apparently large thickness compared to other layers.

Accordingly, it is an object of the present invention to provide a liquid crystal display device which can solve the above-mentioned problems of the prior art and can realize image display of high quality by obviating leaking of light of spacers for holding a cell gap and by setting a uniform and accurate cell gap over a whole region including a seal region which is provided between two substrates.

To achieve the above-mentioned object, spacers are formed over a common electrode and outside a region on which the common electrode is formed of one main surface of one of a pair of substrates which constitute a liquid crystal display device (a liquid crystal layer being formed between the substrates) according to the present invention.

In a liquid crystal display device having a TN (twisted Nematic) type liquid crystal layer and is subjected to an active matrix driving, for example, the common electrode is arranged to face pixel electrodes formed in respective pixels in an opposed manner. In the liquid crystal display device subjected to an active matrix driving (hereinafter referred to as an active matrix type liquid crystal display device), each pixel is provided with an active element (thin film transistor, thin film diode or the like) and hence, voltage corresponding to a display image is applied to pixel electrodes.

To the contrary, the above-mentioned common electrode faces the pixel electrodes in an opposed manner while sandwiching the liquid crystal layer therebetween and the light transmissivity of the liquid crystal layer present between the common electrode and the pixel electrode is controlled through an electric field generated therebetween (accordingly, the common electrode being also referred to as counter electrode). Accordingly, a plurality of pixel electrodes and a plurality of active elements corresponding to the number of pixels are formed on a main surface of the other one of the above-mentioned pair of substrates. While the pixel electrodes are formed on respective pixels, the common electrode is formed with an area enough to face a plurality of pixel electrodes in an opposed manner. The common electrode may be formed as a single conductive film which covers an image display area (referred to as a display area hereinafter) of the liquid crystal display device. Alternatively, the common electrode may be separately formed into a plurality of conductive films within the display area (however, each conductive film being wider than individual conductive film which constitutes the pixel electrode).

Although the common electrode is formed in a portion of the main surface of one of the above-mentioned pair of substrates which correspond to the display area, at least a portion of an end portion of the common electrode is arranged at least at the inner side than an end portion of the substrate. That is, on the main surface of one of the above-mentioned pair of substrates, a region where the common electrode is not formed is present along the end portion thereof and this region is served for the formation of the sealing member for laminating the pair of substrates with a given gap therebetween. According to the present invention, spacers are formed on the common electrode in the above-mentioned display area and a peripheral portion (a portion outside the region where the common electrode is formed) of the main surface of the substrate on which the common electrode is formed separately. In the liquid crystal display device according to the present invention, the above-mentioned spacers may be columnar spacers which have a cylindrical shape or a square pillar shape having a trapezoidal longitudinal cross section and each columnar spacer has a surface which is fixed to one of the above-mentioned pair of substrates and a surface which is brought into contact with the other one of a pair of substrates.

Among columnar spacers, orientation films may be formed on at least portions of surfaces of the columnar spacers formed on at least common electrodes. Although it is preferable that the orientation film is configured to cover the surface of the columnar spacers, it is not always necessary for the orientation film to cover the entire surface. That is, portions of the orientation films may be extended over the common electrode or upper surfaces of thin films formed on the common electrode. That is, in a step for forming the orientation film, even when the orientation film is not formed on one portion of the surface of the columnar spacer, the exercise of the present invention is not impeded. By forming the orientation films on the surfaces of the columnar spacers (at least portions), the columnar spacers are fixed to given positions.

Further, at a peripheral portion of a main surface of the substrate on which the common electrode is formed (outside the region where the common electrode is formed), the columnar spacers may be formed at both sides of a portion where the above-mentioned sealing member is formed (sealing portion). The sealing portion fixes a main surface of one of the pair of substrates on which the common electrode is formed and a main surface of another of the pair of substrates on which a plurality of pixel electrodes are formed while both of the main surfaces face each other, so that a space in which liquid crystal composition is filled is formed among both of the main surfaces and the sealing portion. The sealing portion is arranged to substantially surround portions of the main surfaces of respective substrates corresponding to the display area (in a strict sense, discontinued portions or openings are formed in the sealing portion for allowing the filling of liquid crystal composition into the space). Accordingly, in one of the liquid crystal display devices according to the present invention, the columnar spacers are formed at both sides, that is, inside (display area side) and outside (substrate end portion side) of the sealing portion in the above-mentioned peripheral portion. The columnar spacers which are formed in the peripheral portion of the main surface of the substrate are positioned in the vicinity of the sealing portion as viewed from the whole main surface of the substrate.

With respect to the liquid crystal display device having such a structure, in the assembling step, the functions of three types of columnar spacers which differ in spacer forming position (that is, spacers being respectively formed on the common electrode and inside and outside of the sealing portion in the peripheral portion) are made to cooperate with each other so as to suppress the fluctuation of the cell gap. To compare three types of columnar spacers with respect to the clearance between the main surface of the substrate on which the pixel electrodes are formed and the upper surface of the columnar spacer which faces the main surface in opposed manner, the clearance on the common electrode is the smallest.

On the other hand, in a step for sealing the liquid crystal composition into the liquid crystal display device, the pressure in the space surrounded by both main surfaces of a pair of substrates and the sealing portion becomes lower than the pressure at the periphery of the space. Accordingly, the seal member and the columnar spacers on the common electrode are compressed due to the main surfaces of a pair of substrates. The sealing member which is compressed by the main surfaces of a pair of substrates has a portion thereof projected from a portion of the main surface of the substrate on which the sealing member is to be originally formed and flows out to both sides of the portion. Further, when an excessive pressure is applied to the columnar spacers on the common electrode, the columnar spacers are deformed and it is impossible to form a desired cell gap at a point of time that liquid crystal composition is filled in the space.

To the contrary, two types of columnar spacers which are provided at the peripheral portion of the main surface of the substrate on which the common electrode is formed attenuate the pressure applied to the columnar spacers on the sealing member and the common electrode due to the main surfaces of a pair of substrates. Here, the height (dimension in the thickness direction of the substrate) of either one of two types of columnar spacers formed on the peripheral portion of the main surface of the substrate may be set greater than the height of the columnar spacers on the common electrode.

Further, another liquid crystal display device of the present invention may be constituted as follows. That is, the color filters are formed on one of a pair of substrates on which the common electrode is formed and the transparent protective film and the common electrode are laminated on the color filters in this order. With respect to the color filters, a plurality of color layers (filter layers or color filters in a narrow definition) having different colors are formed on one of a pair of substrates. A light shielding layer such as a black matrix may be formed between the color layers or neighboring color layers may have boundaries thereof laminated to each other thus forming light shielding portions. Further, the color layers may be partitioned for every pixel or the color layer may stride over neighboring pixels which have the same color. In conformity with the shape of these color layers, openings which partition the color layers may be formed in the light shielding layer (including the above-mentioned light shielding portion) or the light shielding layers are formed in the extending direction of the color layers in a stripe shape.

According to still another liquid crystal display device, although the device shares the same shape with the above-mentioned liquid crystal display device of the present invention with respect to the common electrode, the sealing portion and the orientation film, the liquid crystal display device is characterized by a structure including a transparent protective film extending to the outside (substrate end-portion side) of the sealing portion and columnar spacers formed on the transparent protective film at the peripheral portion of the main surface of the substrate (outside the common electrode). The transparent protective film covers a plurality of above-mentioned color layers and a thickness of the transparent protective film is set greater than the thickness of respective color layers.

Accordingly, the unevenness derived from a plurality of color layers formed on the main surface of the substrate and the light shielding layer or the light shielding portion formed between the color layers are attenuated or leveled by an upper surface of the transparent protective film. Accordingly, the difference between the upper surface of the columnar spacers formed on the common electrode and the upper surface of the columnar spacers formed on the periphery of the main surface of the substrate (clearances between the upper surfaces and the main surface of the other substrate on which the pixel electrodes are formed) can be reduced.

Accordingly, the pressure applied to the columnar spacers on the common electrode due to the main surfaces of a pair of substrates can be quickly distributed to the columnar spacers formed on the peripheral portion of the main surface of the substrate. Further, due to such distribution of the pressure to two types of columnar spacers, the load applied to the sealing member can be quickly attenuated. According to another liquid crystal display device, the columnar spacers in the peripheral portion of the main surface of the substrate are formed at at least one of the inside and outside of the sealing portion.

The spacers which are formed outside the region where the common electrode of the liquid crystal display device according to the present invention is formed may be formed in a wall shape along the above-mentioned sealing portion or may be formed in a shape bent like a hook (having a L-shaped transverse cross-section) along corners of the sealing portion. An example of a typical constitution of the liquid crystal display device according to the present invention is described as follows.

In a liquid crystal display device comprising a driving substrate having a main surface on which a number of switching elements (active elements) corresponding to respective pixels are formed, a color filter substrate having a main surface on which a display area is formed by arranging color filters of more than one color corresponding to the respective pixels therein, and liquid crystals being sealed in a space defined by the main surface of the driving substrate, the main surface of the color filter substrate, and a sealing material sticking respective peripheries of the main surfaces to each other, the color filters are covered with a transparent protective film, a common electrode is formed of a transparent conductive film above the transparent protective film in the display area, the sealing material is formed between an end of the common electrode and an end of the color filter substrate above the transparent protective film, columnar spacers are formed above the common electrode, between the end of the common electrode and the sealing material, and outside the sealing material over the transparent protective film, and an orientation film is formed at least partially on each surface of the columnar spacers, the common electrode, and the transparent protective film.

When the switching elements are constituted of thin film transistors, the driving substrate is also referred to as a TFT substrate. Further, the main surface of the driving substrate on which the switching elements are formed and the main surface of the color filter substrate on which the color filters are formed are arranged to face each other in an opposed manner while sandwiching the liquid crystal layer therebetween in the liquid crystal display device and hence, these main surfaces are also respectively referred to as inner surfaces of the substrates.

Although the orientation film is formed such that the orientation film covers, for example, the columnar spacers, the common electrode and the transparent protective film as mentioned previously, even when the orientation film cannot cover portions of upper surfaces of these components (portions which constitute "shade" with respect to an orientation film material supply source, for example) due to manufacturing conditions of the color filter substrate, such a constitution is also allowable so long as the image display of the liquid crystal display device is not hampered. One example of the typical constitution of the liquid crystal display device according to the present invention is described as follows. Further, from a different viewpoint, the constitution of the liquid crystal display device according to the present invention can also be described as follows.

In a liquid crystal display device comprising a first substrate having a main surface on which a plurality of pixels having switching elements and pixel electrodes connected to the switching elements are formed, a second substrate having a main surface on which a common electrode is formed and having the main surface arranged to face the main surface of the first substrate in an opposed manner, a sealing material being formed between peripheries of both of the main surfaces of the first substrate and the second substrate(extending substantially along the peripheries of the main surface of the respective substrates); and a liquid crystal layer being formed in a space provided by the main surface of the first substrate, the main surface of the second substrate and the sealing material, the common electrode and the plurality of the pixel electrodes are arranged to face each other in opposed manner while interposing the liquid crystal layer therebetween thus constituting a display area, at least a part of an edge of the common electrodes is spaced from an end portion of the main surface of the second substrate and forms a peripheral area (area on the main surface of the second substrate where the common electrode is not formed) in a periphery of the main surface of the second substrate, at least a part of the sealing material is formed on the peripheral area, columnar spacers are formed above the common electrode and above the peripheral area at both sides of the sealing material (at the peripheral side and at the inside of the main surface of the second substrate with respect to the extending direction of the sealing material) (that is, three types of regions) respectively, and an orientation film is formed at least on a part of each surface of the respective columnar spacers and the common electrode.

With respect to this liquid crystal display device, compared to the above-mentioned liquid crystal display device, the color filters, that is, a plurality of color layers which differ in color from each other may be formed on either the first substrate or the second substrate.

By adopting any one of the above-mentioned constitutions, in the liquid crystal display device, the columnar spacers can be fixed to given positions so that a given cell gap can be secured over the whole region of two substrates without giving influence on the light transmission of pixels.

DETAILED DESCRIPTION

Preferred embodiments of a liquid crystal display device according to a present invention are explained in detail in conjunction with attached drawings hereinafter. Here, a TN-type liquid crystal display device which uses thin film transistors as switching elements is explained as an example.

Figure 1:
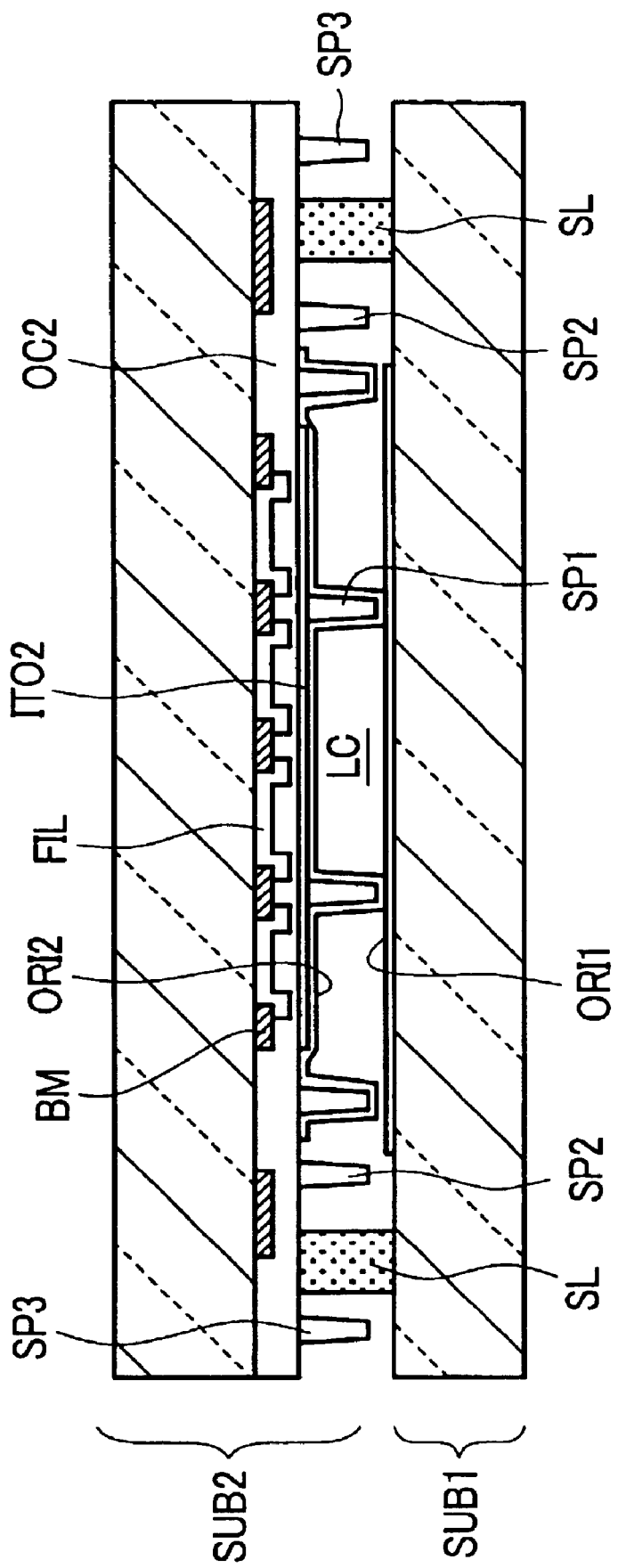
FIG. 1 is a cross-sectional view of a liquid crystal display device for schematically explaining the first embodiment of a liquid crystal display device according to the present invention.

FIG. 1 is a cross-sectional view of a liquid crystal display device for schematically explaining the first embodiment of a liquid crystal display device according to the present invention. The liquid crystal display device is illustrated in a state before applying a pressing force to the substrates in the thickness direction to determine a distance between two substrates which sandwich a liquid crystal layer, a so-called cell gap. In the drawing, numeral SUB1 indicates a thin film transistor substrate and SUB2 indicates a color filter substrate. Although a large number of thin film transistors are formed on an inner surface of the thin film transistor substrate SUB1 corresponding to pixels, only an orientation film ORI1 which is formed as an uppermost layer is shown in the drawing.

On an inner surface of the color filter substrate SUB2, color filters FIL in a plurality of colors (usually, red (R), green (G), blue (B)) which are defined by a black matrix BM which constitutes a light shielding layer are formed. A transparent protective film which is also referred to as an overcoat layer (hereinafter referred to as the overcoat layer) OC2 having a leveling function and a protection function is formed on the color filters FIL such that the overcoat layer covers the color filters FIL. In forming the black matrix BM and the color filters FIL using resin, a large unevenness remains on surfaces thereof and hence, the overcoat layer OC2 is indispensable. The overcoat layer OC2 also has a function of protecting the color filters from chemicals in an etching step or the like in a subsequent manufacturing process. Further, a common electrode ITO2 formed of a transparent conductive film is formed above the overcoat layer OC2.

While the common electrode ITO2 is selectively formed at a given position on the overcoat layer OC2, columnar spacers SP1 to SP3 are formed above and outside the common electrode ITO2 disposed in a display area including a region where the color filters FIL are formed and its peripheral vicinity, and inside and outside as well as in the vicinity of a sealing SL. Columnar spacers formed in the display area is indicated by SP1, the columnar spacers disposed close to and inside the seal SL are indicated by SP2, and the columnar spacers disposed close to and outside the seal SL are indicated by SP3. The columnar spacers SP1 in the display area are positioned above the black matrix BM which defines the color filters FIL of respective colors. Accordingly, the columnar spacers SP1 affect no influence to a display light passing through the liquid crystal LC. Accordingly, the columnar spacers SP1 are disposed at positions which do not induce the reduction of contrast caused by leaking of light or the like.

In this embodiment, the common electrode ITO2 is not present below the columnar spacers SP2 which are disposed at the outermost periphery of the display area and hence, tops of the columnar spacers provided at such a portion are illustrated such that the tops are not brought into contact with the thin film transistor substrate side. However, since the thickness of the common electrode ITO2 is extremely thin so that, in reality, these columnar spacers are brought into contact with the orientation film ORI1 arranged on inner surfaces of the thin film transistors as in the case of the columnar spacers SP1 and hence, these columnar spacers SP2 sufficiently function as spacers.

In this manner, the columnar spacers SP1 disposed in the display area and the columnar spacers SP2, SP3 disposed in the outer periphery of the display area are formed after forming the common electrode ITO2. The columnar spacers SP1 and some columnar spacers SP2 (spacers which are formed in the vicinity of an end portion of the common electrode ITO2) are securely fixed at positions on the inner surface of color filter substrate SUB2 using the orientation film ORI2 which covers the columnar spacers SP1 and the columnar spacer SP2. Although the orientation film per se is thin so that there is a possibility that the generation of a short-circuit between conductors which sandwich the orientation film can not be prevented, in the structure shown in FIG. 1, due to the above-mentioned manufacturing steps, the common electrode ITO2 is separated from the inner surface of the thin film transistor substrate SUB1 with the height of the columnar spacers SP1. Accordingly, even when a pressing force is applied to the pair of the substrates SUB1, SUB2 in the cell gap adjustment step, there is no possibility that a short-circuit is generated between the common electrode ITO2 and any electrodes or wirings formed on the thin film transistor substrate SUB1 but not shown in the drawing, whereby the pixel defects are not brought about.

In applying a pressing force for the gap adjustment before the seal SL is completely cured, the columnar spacers SP2 and SP3 formed close to and inside and outside of the seal SL have a function of defining the cell gap. Here, other columnar spacers SP1 are firmly held between both substrates with a small amount of collapse. Accordingly, the change of cell gap between both substrates derived from the fluctuation of environment which may occur thereafter can be suppressed. Further, the columnar spacers SP2, SP3 which are positioned inside and outside of the seal SL also have a function of maintaining the height of coating by preventing sagging of a coated sealing material and flowing-out of the coated seal to both side surfaces.

According to this embodiment, the columnar spacers can be fixed at given positions so that the short-circuit between the substrates which has been generated in the prior art can be prevented and a given cell gap is secured between two substrates over the whole region.

Figure 2:
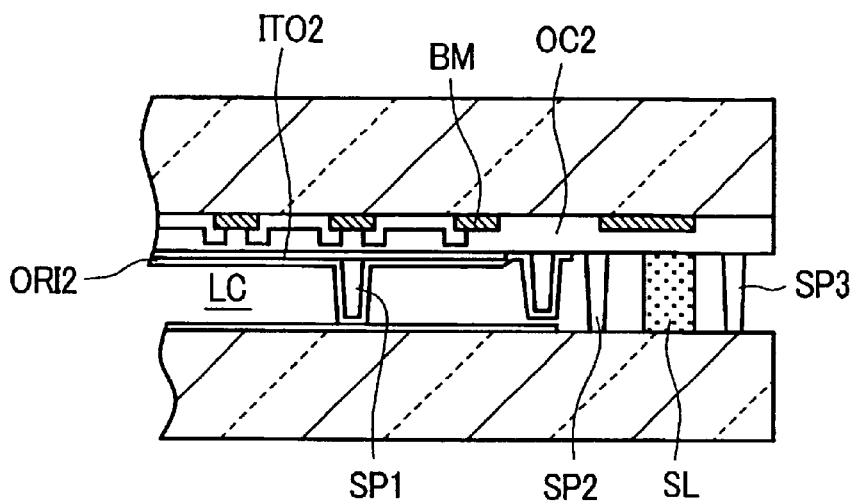
FIG. 2 is a cross-sectional view of a liquid crystal display device for schematically explaining the second embodiment of a liquid crystal display device according to the present invention.

FIG. 2 is a cross-sectional view of a liquid crystal panel for schematically explaining the second embodiment of the liquid crystal display device according to the present invention. This embodiment is characterized in that the height of columnar spacers SP2, SP3 disposed close to and inside and outside of a seal SL is set greater than the height of other columnar spacers SP1. In one method for making the height of the columnar spacers SP2, SP3 greater than the height of the other columnar spacers SP1, a color layer is laminated on a main surface of a color filter substrate SUB2 and the columnar spacers SP2, SP3 are formed on a platform formed of so to speak, the laminated color layers.

Further, when the columnar spacers are formed by selectively exposing resin-containing photosensitive material using a mask, an exposure amount to portions which are expected to become the columnar spacers SP2, SP3 is made greater than an exposure amount to portions which are expected to become the columnar spacers SP1 and the degree of bridging of these portions is increased whereby it is possible to form columnar spacers SP1 to SP3 such that the height of the columnar spacers SP2, SP3 becomes greater than the height of the columnar spacers SP1. Here, this embodiment is substantially equal to the first embodiment with respect to other constitutions.

According to this embodiment, a pressing force at the time of laminating two substrates SUB1, SUB2 and at the time of performing the cell gap adjustment can be enhanced so that both substrates SUB1, SUB2 can be laminated and fixed more firmly whereby it is possible to set the cell gap in the display area more accurately.

Figure 3:
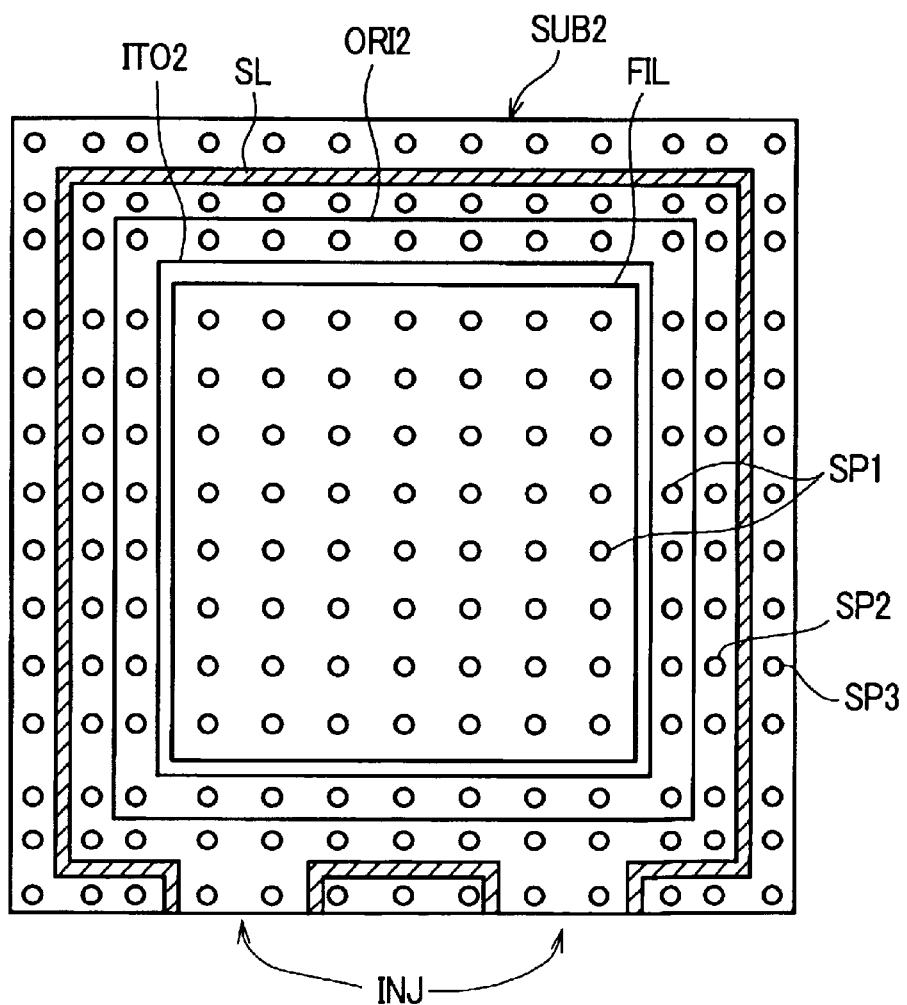
FIG. 3 is a plan view for schematically explaining the constitution of a color filter substrate according to the first and second embodiments of the present invention.

FIG. 3 is a plan view for schematically explaining the constitution of the color filter substrate SUB2 according to the first and the second embodiments of the present invention, wherein symbols which are equal to symbols used in FIG. 1 and FIG. 2 correspond to parts identical to the parts shown in these drawings. On a major region disposed at a center portion of an inner surface of the color filter substrate SUB2, the color filter FIL, the common electrode ITO2 and the orientation film ORI2 are formed. The major region includes the display area, wherein the columnar spacers SP1 are provided right above the black matrix BM which defines respective filters and define the cell gap between the color filter substrate and the thin film transistor substrate SUB1 not shown in the drawing.

Then, in the inside and the outside as well as in the vicinity of the seal SL, columnar spacers SP2 and SP3 are arranged. Although the columnar spacers SP1, SP2, SP3 of this embodiment are depicted such that all of them have the circular cross section (a horizontal cross section), the cross-sectional shapes of these columnar spacers should not be limited to such a circular shape. The columnar spacer may have e.g. a columnar shape having an elliptical cross section, a rod-like shape having other cross section, a frustum of a cone or a rectangular pyramid. The seal SL has a portion thereof coated such that discontinued portions are formed and liquid crystal filling ports INJ which are served for filling liquid crystal are formed in these portions.

Although it may be possible to provide no columnar spacer at the portion where the liquid crystal filling port INJ is formed, by providing one or several columnar spacers in the liquid crystal filling port INJ as shown in the drawing, it is possible to make the columnar spacers SP2 function as rectifying members which allow liquid crystal to be filled flow into the major region substantially uniformly.

Figure 4:
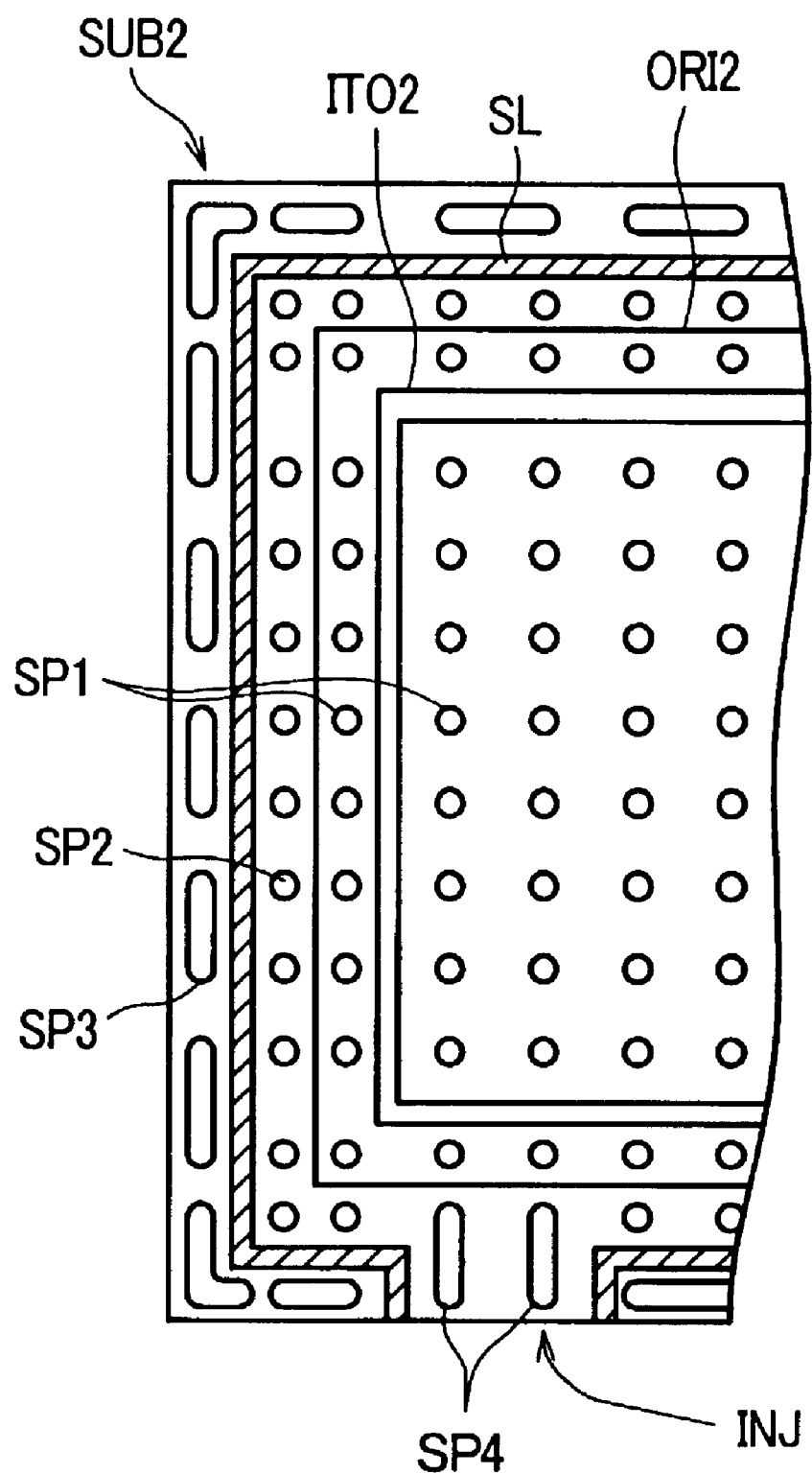
FIG. 4 is a partial plan view for schematically explaining the constitution of a color filter substrate of the second embodiment of the present invention.

FIG. 4 is a partial plan view for schematically explaining the constitution of the color filter substrate SUB2 according to the second embodiment of the present invention, wherein symbols equal to the symbols used in FIG. 1 to FIG. 3 indicate parts identical with corresponding parts. The constitution shown in FIG. 4 is characterized in that the columnar spacers SP3 which are arranged outside of the seal SL are formed in a wall shape which is interrupted along sides of the color filter substrate SUB2. Further, columnar spacers SP4 which are arranged in a liquid crystal filling port INJ are also formed in a similar wall shape and the longitudinal direction of the columnar spacers SP4 is directed in the inflow direction of the liquid crystal. Due to such a constitution, the liquid crystal rectifying action can be enhanced so that it is possible to make the liquid crystal flow into the major region substantially in a uniform manner.

The height of the columnar spacers can be set to either one of heights adopted by the first embodiment and second embodiment. By adopting the columnar spacers having such a shape, an effective area of the columnar spacers outside of the seal SL can be increased. According to this embodiment, in addition to the advantageous effects of the previously mentioned embodiments, a pressing pressure at the time of performing the cell gap adjustment can be increased so that the cell gap adjustment can be performed more reliably. Further, flowing out of a sealing material toward side peripheries of the substrates can be effectively prevented so that the insufficient sealing or the lowering of appearance of a product derived from the non-uniform thickness of the sealing material can be obviated.

Figure 5:
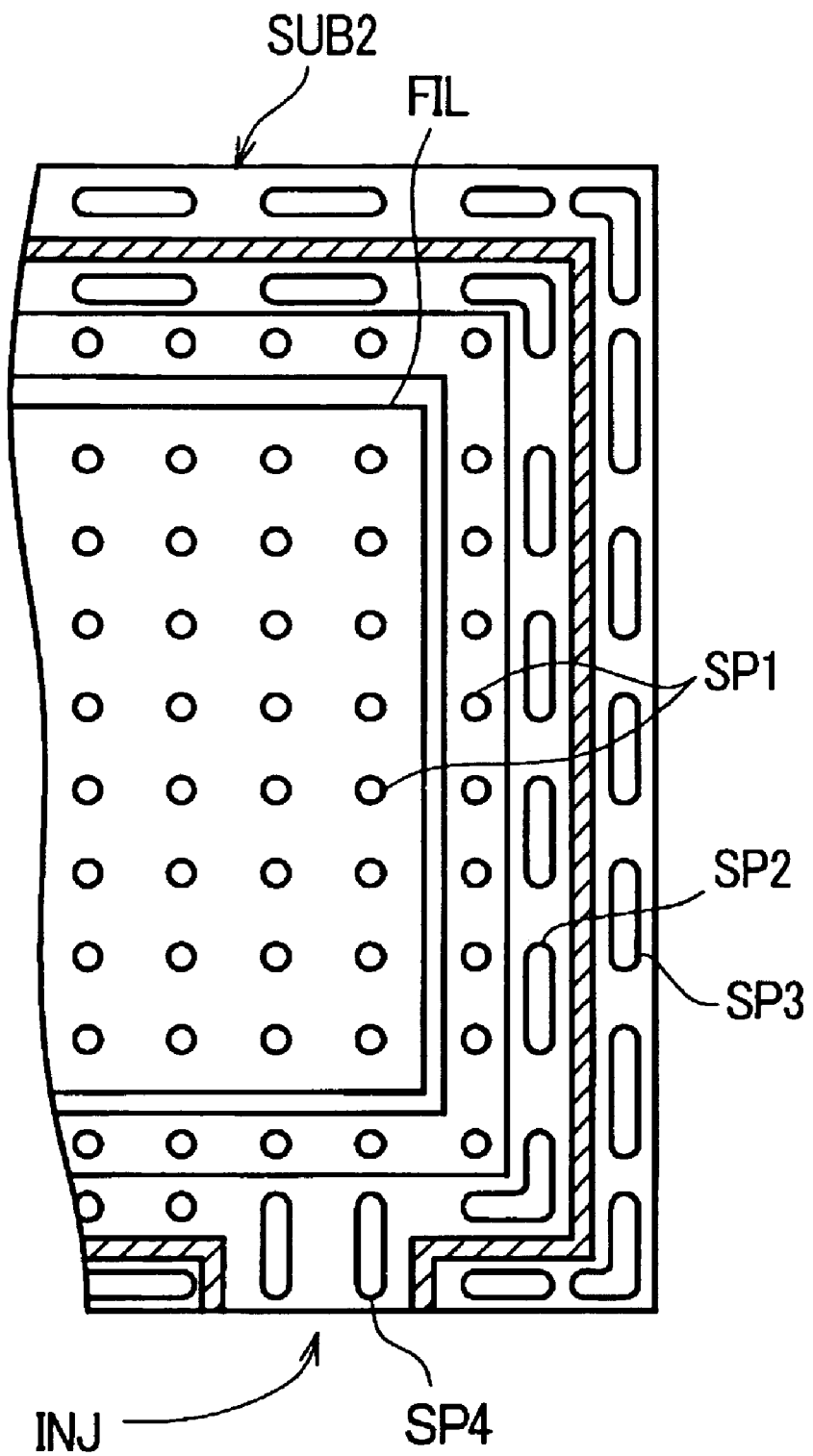
FIG. 5 is a partial plan view for schematically explaining the constitution of a color filter substrate of the third embodiment of the present invention.

FIG. 5 is a partial plan view for schematically explaining the constitution of a color filter substrate according to the third embodiment of the present invention, wherein symbols equal to symbols used in FIG. 5 indicate parts identical with corresponding parts shown in FIG. 4. This constitutional example is characterized in that columnar spacers SP2 which are disposed inside and in the vicinity of a seal SL are formed in a similar wall shape in the same manner as the columnar spacers SP3 formed outside the seal SL in the embodiment shown in FIG. 4. Due to such a constitution, in addition to the advantageous effects of the previously mentioned embodiment, the cell gap adjustment can be performed more reliably. Further, flowing out of a sealing material toward side peripheries of the substrate can be effectively prevented so that the insufficient sealing or the lowering of appearance of a product derived from the non-uniform thickness of the sealing material can be obviated. With respect to the advantageous effects obtained by other portions, they are similar to the advantageous effects obtained by the second embodiment.

Figure 6:
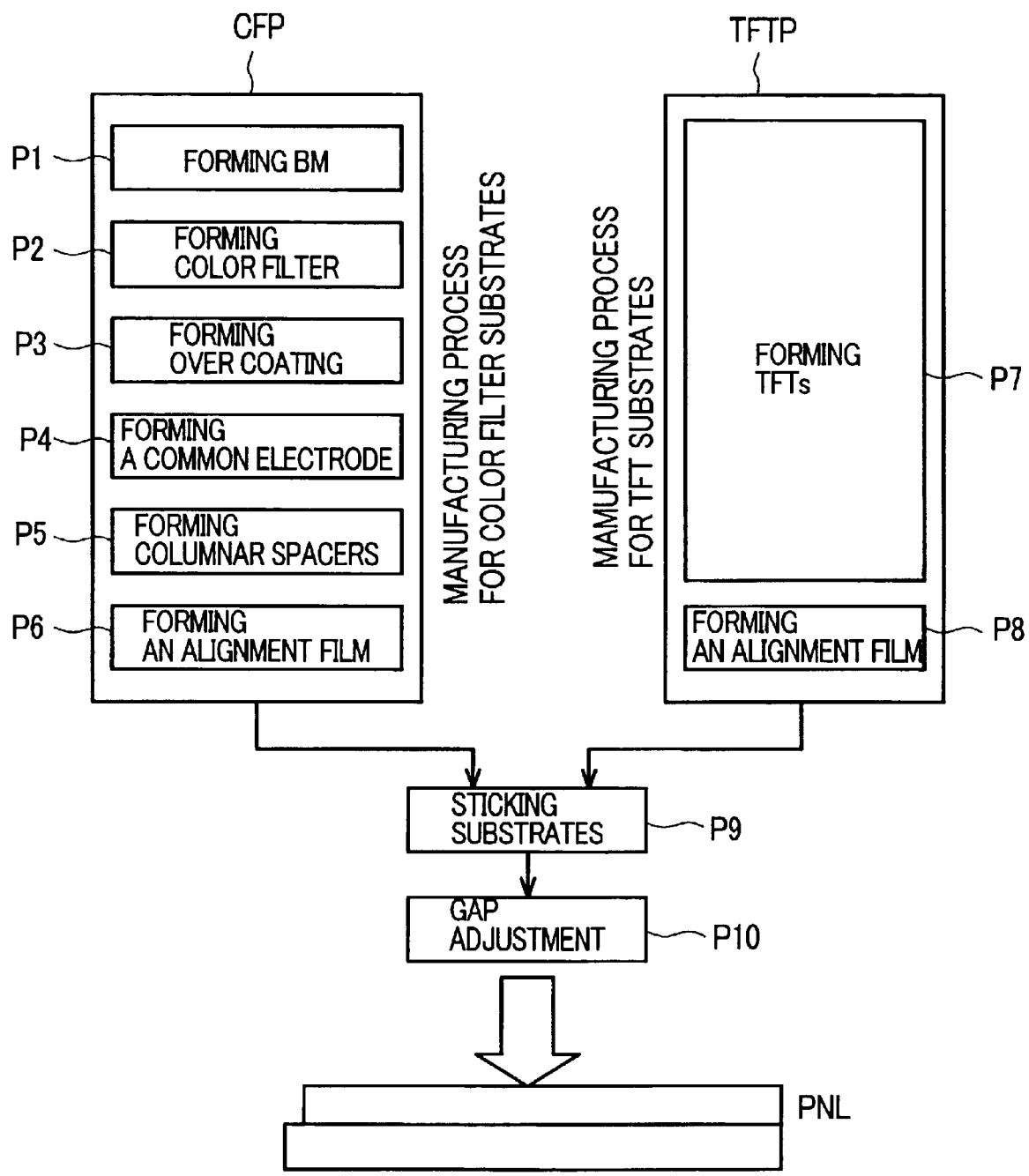
FIG. 6 is a process view for explaining the summary of manufacturing steps of the liquid crystal display device of the present invention.

FIG. 6 is a process view for explaining the summary of a manufacturing process of the liquid crystal display device according to the present invention. In a process CFP for forming the color filter substrate SUB2, the black matrix BM is formed on a glass substrate for color filters (step P1) and color filters FIL in three colors are sequentially formed by embedding using resin materials containing pigments into the opening portions of the black matrix formed (step P2). The overcoat layer OC2 is formed such that the overcoat layer OC2 covers the color filters FIL (step P3). The common electrode ITO2 is formed on the overcoat layer OC2 (step P4).

Then, on the common electrode ITO2 and on the portions of the overcoat layer OC2 where the common electrode ITO2 is not present, the columnar spacers are formed at peripheral portions where the seal SL is coated (step P5). Thereafter, the orientation film ORI2 is coated on the uppermost surface including the columnar spacers and the orientation processing is applied to the orientation film ORI2 using suitable means such as rubbing or the like to obtain the color filter substrate SUB2 (step P6).

On the other hand, with respect to a process TFTP for forming the thin film transistor substrate SUB1, in a given thin film transistor forming step, the thin film transistors are formed using given wiring, electrodes, various types of films and patterning (step P7). Thereafter, the orientation film is formed and the orientation processing is performed in the similar manner so as to obtain the thin film transistor substrate (step P8).

Outer peripheries of the color filter substrate SUB2 and the thin film transistor substrate SUB1 which are manufactured in this manner are laminated to each other using the sealing material (P9), these substrates SUB1, SUB2 are subjected to temporary curing by heating or the irradiation of ultraviolet rays and, thereafter, the gap adjustment is performed using a press and the heat treatment (P10), and the sealing material is subjected to the main curing thus completing the liquid crystal display device PNL.

The columnar spacers in the above-mentioned manufacturing steps are formed by a photolithography technique in which negative-type photosensitive resin is coated and after performing exposure using the mask, uncured portions are removed by etching processing. Accordingly, resin material having viscosity and hardness suitable for defining the cell gap having a given cross-sectional area and height is used. These columnar spacers are positioned right above the common electrode in the display area and are positioned right above the overcoat layer with respect to the periphery of the display area. The columnar spacers which are provided at least in the display area are covered with the orientation film. Further, in the periphery of the display area, the columnar spacers are arranged inside and outside of the sealing portion.

Accordingly, in the process for sticking the thin film transistor substrate SUB1 and the color filter substrate SUB2 to one another and for adjusting the cell gap therebetween, there is no possibility that short-circuit is caused between the common electrode and the electrode or the wiring at the thin film transistor substrate SUB1 side. Further, cell gap adjustment can be performed accurately and it is possible to prevent the coated seal agent from sagging or flowing out to the display area or side surfaces of the substrate so that the reliability is enhanced and the lowering of appearance as a product can be obviated.

Although all columnar spacers are formed on the color filter substrate SUB2 side according to the explanation of the above-mentioned embodiments, the columnar spacers may be formed on the thin film transistor substrate side SUB1. In this case also, the columnar spacers are positioned below the orientation film ORI1 which constitutes the uppermost layer of the thin film transistor substrate SUB1. Such a constitution also brings about advantageous effects similar to those obtained by the above-mentioned respective embodiments. Further, it is also possible to form only the columnar spacers at the sealing portion at one substrate side.

Figure 7:
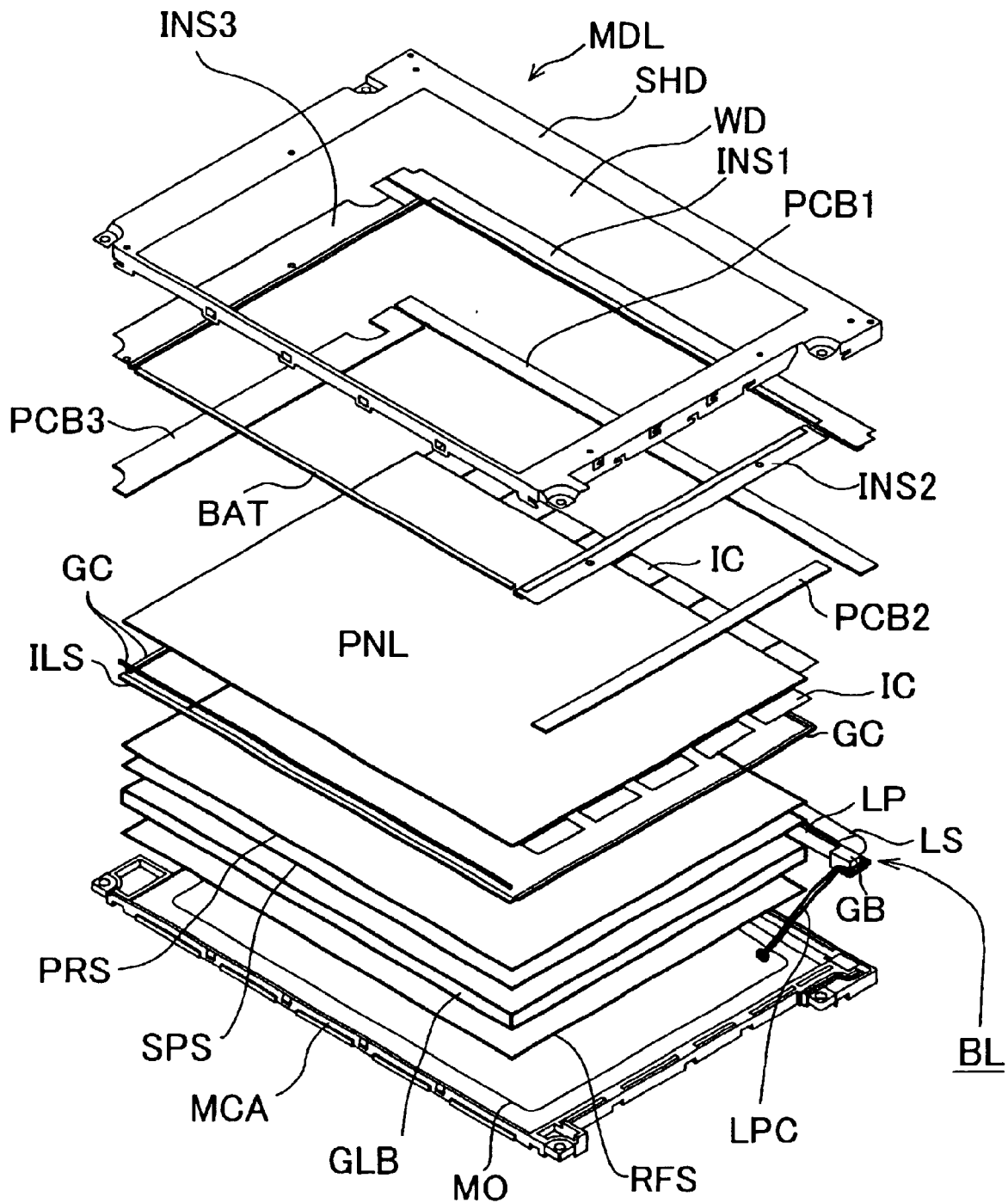
FIG. 7 is a developed perspective view for explaining the whole constitution of a liquid crystal display module using the liquid crystal display device of the present invention.

FIG. 7 is a developed perspective view for explaining the entire constitution of a liquid crystal display module using the liquid crystal display device according to the present invention. The liquid crystal display module MDL is constituted by integrally incorporating driving means necessary for video display, a backlight and other parts into the liquid crystal display device which has been explained in conjunction with the above-mentioned embodiments. In FIG. 7, reference symbol SHD indicates a shield casing formed of a metal sheet (also referred to as a metal frame), WD indicates a display window, INS1 to INS3 indicate insulation sheets, PCB1 to PCB3 indicate printed circuit boards constituting driving means. In general, a so-called flexible printed circuit board is used as the drain-side printed circuit board PCB1 which supplies video signals and the gate-side printed circuit board PCB2 which supplies thin film transistor selection signals and a hard printed circuit board is used as the interface printed circuit board PCB3 in many cases.

Further, IC indicates a position where an integrated circuit chip which constitutes a driving circuit is mounted, PNL indicates a liquid crystal display device, GC indicates a rubber cushion, ILS indicates a light-shielding spacer, PRS indicates a prism sheet, SPS indicates a diffusion sheet, GLB indicates a light guide plate, RFS indicates a reflection sheet, MCA indicates a lower casing (mold frame) which is formed by integral molding, MO indicates an opening of MCA, LP indicates a fluorescent lamp, LPC indicates a lamp cable, GB indicates a rubber bushing which supports the fluorescent tube LP, BAT indicates a double-sided adhesive tape, and BL indicates a backlight formed of a fluorescent lamp, a light guide plate and the like. The liquid crystal display module MDL is assembled by laminating a diffusion plate member on a structure body in accordance with the above-mentioned arrangement relationship.

The liquid crystal display module MDL includes two types of accommodating and holding members consisting of a lower casing MCA and a shield casing SHD, wherein the insulation sheets INS1 to INS3, the printed circuit boards PCB1 to PCB3 and the liquid crystal display device PNL are accommodated in and fixed to the metal-made shield casing SHD and the fluorescent lamp LP, the light guide plate GLB, the backlight BL made of the prism sheet PRS and the like are accommodated in the lower casing MCA. The lower casing MCA and the shield casing SHD are integrally merged to form the liquid crystal display module MDL. On the interface circuit board PCB3, an integrated circuit chip which receives video signals from an external host computer and also receives control signals such as timing signals and the like, a timing converter TCON which generates clock signals for display by processing various types of timing signals from the external host computer and the like are mounted. The constitution shown in FIG. 7 is merely an example and it is needless to say that the liquid crystal display module MDL can adopt constitutions corresponding to other applicable equipments.

Figure 8:
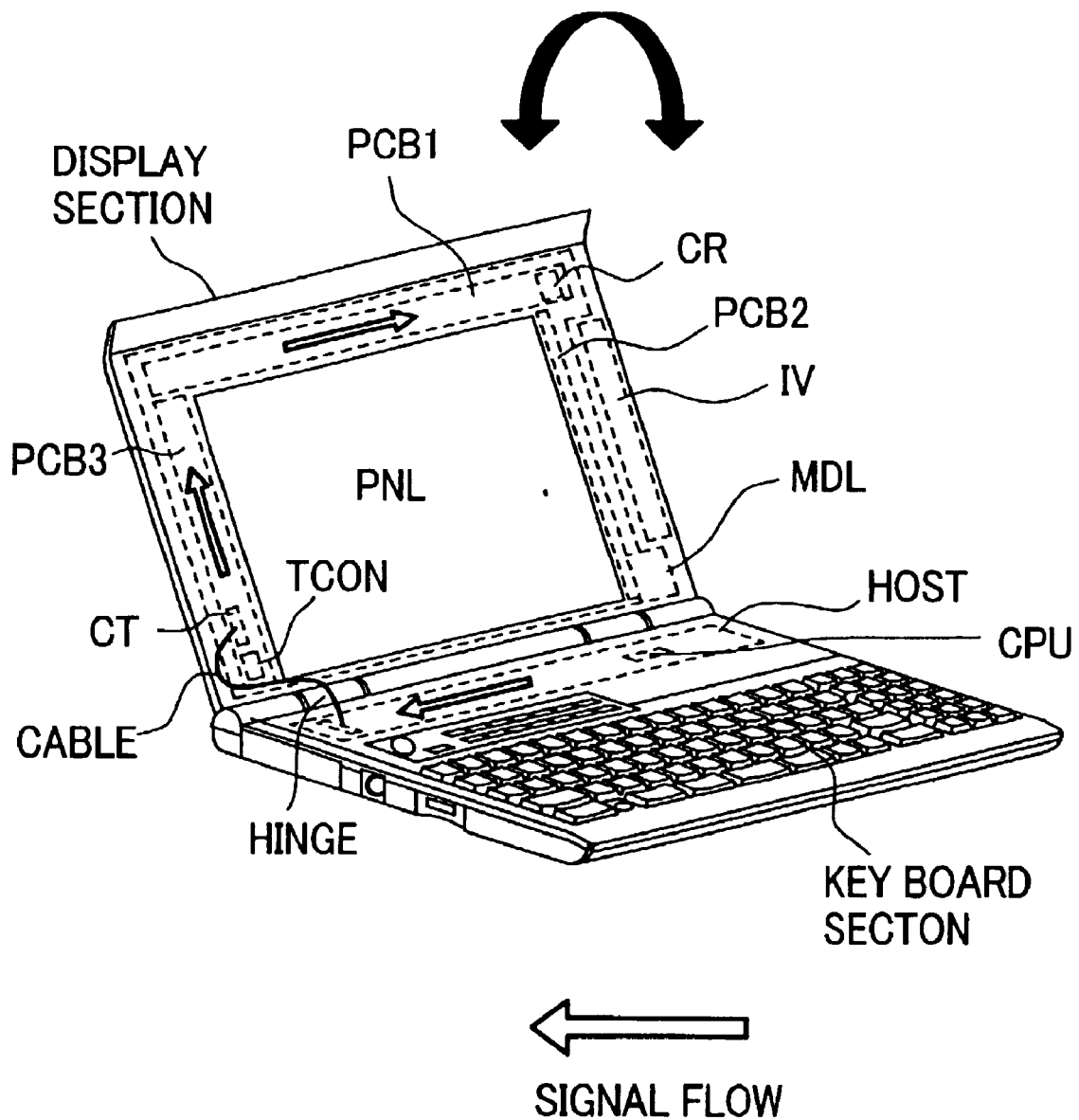
FIG. 8 is a perspective view of a notebook type computer as an example of an electronic equipment mounting the liquid crystal display device of the present invention thereon.

FIG. 8 is a perspective view of a notebook type computer as an example of an electronic equipment on which the liquid crystal display device of the present invention is mounted. The notebook type computer (portable personal computer) is constituted of a key board section (body section) and a display section which is connected to the keyboard section by means of a hinge. The key board section includes the display signal generating function means including a keyboard, a host (host computer), a CPU and the like, while the display section includes a liquid crystal display device PNL. Around the display section, printed circuit boards PCB1, PCB2, PCB3 and an inverted power source board which constitutes a backlight power source are mounted. Then, the liquid crystal display module explained in conjunction with FIG. 7 which is constituted by integrally forming the above-mentioned liquid crystal display device PNL, the printed circuit boards PCB1, PCB2, PCB3, the inverter power source board and the backlight is actually mounted.

The use of the liquid crystal display device according to the present invention is not limited to the notebook type personal computer which has been explained in conjunction with FIG. 8 and the liquid crystal display device according to the present invention is applicable to a large-sized monitor such as a display device of a desktop personal computer or a small-sized monitor of a portable information terminal, a portable telephone terminal or the like.

As has been described heretofore, according to the present invention, the columnar spacers in the display area are formed on the common electrode and the orientation film is applied to the columnar spacers. Accordingly, there is no fear that the common electrode generates the short-circuit between the common electrode and the electrodes or the wiring on the thin film transistor substrate side. Further, with the use of resin material having proper property, it is possible to accurately perform the cell adjustment and to prevent the sagging or the flow-out of the applied sealing material into the display area or the side surfaces of the substrates. Accordingly, it is possible to provide the liquid crystal display device which enhances the reliability and the appearance as a product.

What is claimed is:

1. A liquid crystal display device comprising:
   a driver substrate having a main surface on which a number of switching elements(active elements) corresponding to respective pixels are formed;
   a color filter substrate having a main surface on which a display area is formed by arranging color filters of more than one color corresponding to the respective pixels therein; and
   liquid crystals being sealed in a space defined by the main surface of the driver substrate, the main surface of the color filter substrate, and a sealing material sticking respective peripheries of the main surfaces to each other, wherein
   the color filters are covered with a transparent protective film,
   a common electrode is formed of a transparent conductive film above the transparent protective film in the display region,
   the sealing material is formed between an end of the common electrode and an end of the color filter substrate above the transparent protective film,
   columnar spacers are formed above the common electrode, between the end of the common electrode and the sealing material, and outside the sealing material over the transparent protective film, and
   an alignment film is formed at least partially on each surface of the columnar spacers, the common electrode, and the transparent protective film.

2. A liquid crystal display device according to claim 1, wherein the columnar spacers provided in the vicinity of the sealing material are higher in a direction toward the substrate than those in the display area.

3. A liquid crystal display device according to claim 1, wherein the sealing material has an opening for injecting the liquid crystals therethrough, and the opening has the columnar spacers therein.

4. A liquid crystal display device comprising:
   a first substrate having a main surface on which a plurality of pixels having switching elements and pixel electrodes connected thereto, respectively;
   liquid crystal display element;
   a second substrate having a main surface on which a common electrode is formed and being arranged by facing the main surface of the second substrate to that of the first substrate;
   a sealing material being formed between peripheries of both of the main surfaces of the first substrate and the second substrate; and
   a liquid crystal layer being formed in a space provided by the main surface of the first substrate, the main surface of the second substrate, and the sealing material, wherein
   the common electrode is opposite the plurality of the pixel electrodes by interposing the liquid crystal layer therebetween and constitutes a display area,
   at least a part of an edge of the common electrode is spaced from an end portion of the main surface of the second substrate and forms a peripheral area in a periphery of the main surface of the second substrate,
   at least a part of the sealing material is formed on the peripheral area,
   columnar spacers are formed above the common electrode and above the peripheral area at both sides of the sealing material, respectively, and
   an alignment film is formed at least a part of each surface of the respective columnar spacers and the common electrode.

* * * * *